G. O. WALTERS.
COMBINED WINDOW SCREEN AND FLY TRAP.
APPLICATION FILED MAY 19, 1915.
1,182,333.
Patented May 9, 1916.
2 SHEETS—SHEET 1.
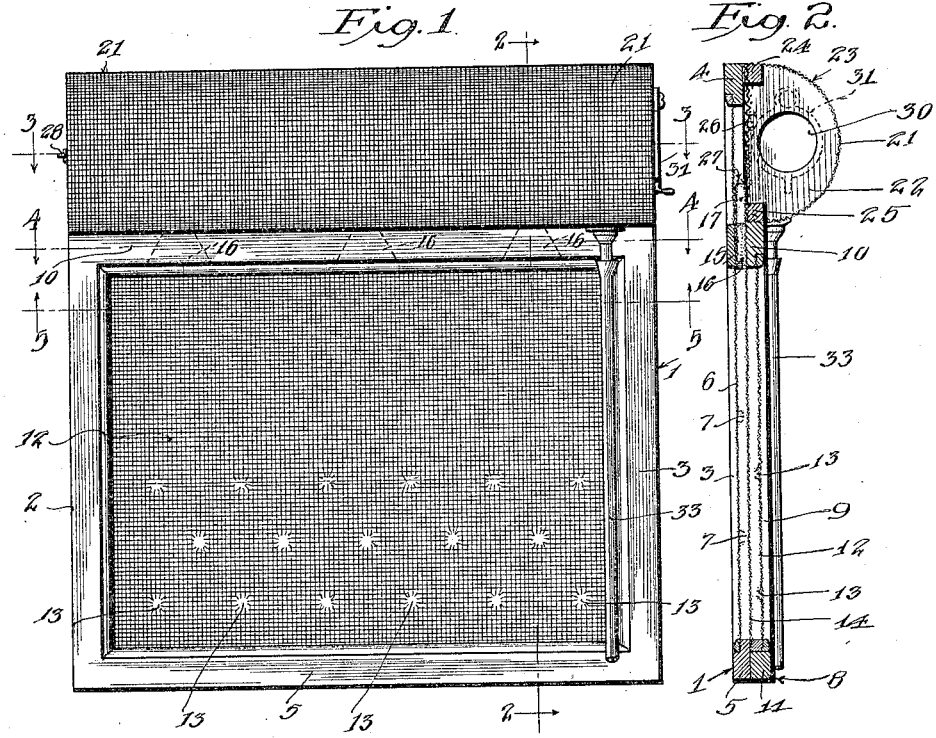
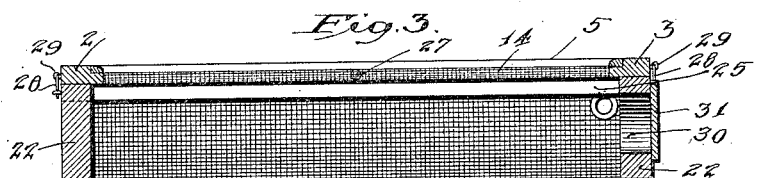
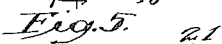
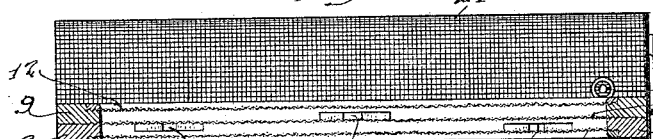
Inventor
Guy O. Walters.

G. O. WALTERS.
COMBINED WINDOW SCREEN AND FLY TRAP.
APPLICATION FILED MAY 19, 1915.
1,182,333. Patented May 9, 1916.
2 SHEETS—SHEET 2.
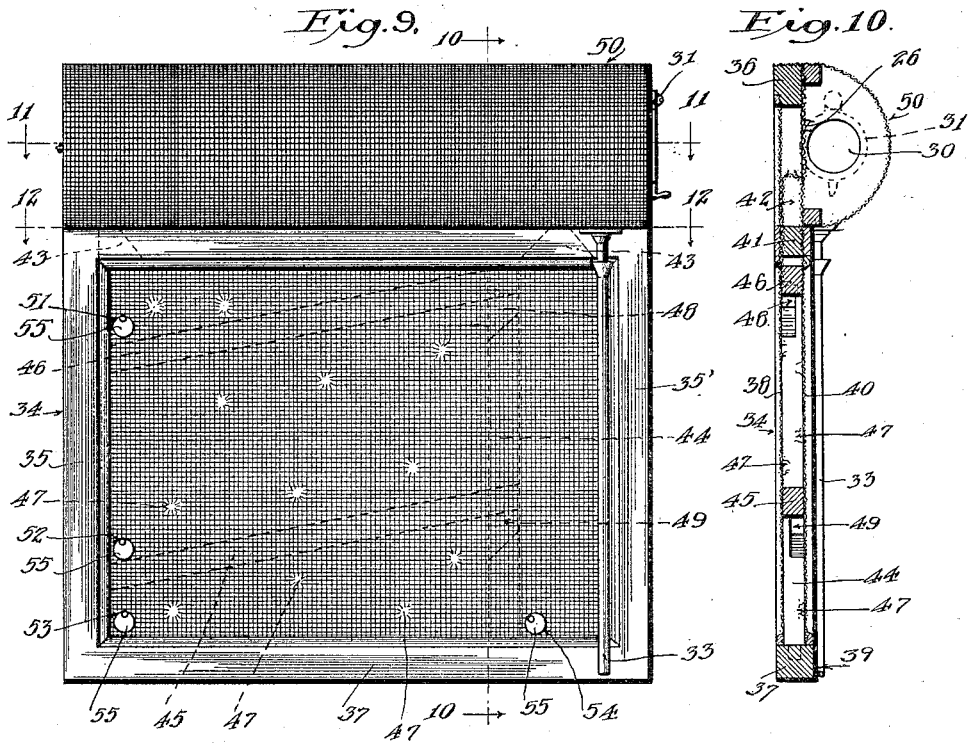
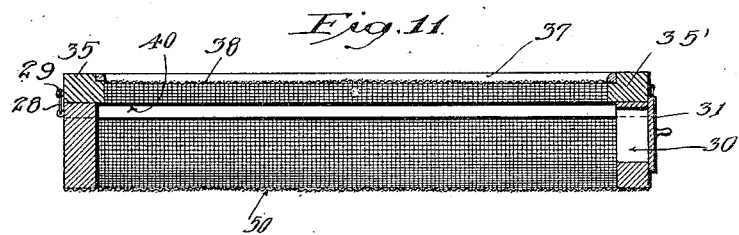
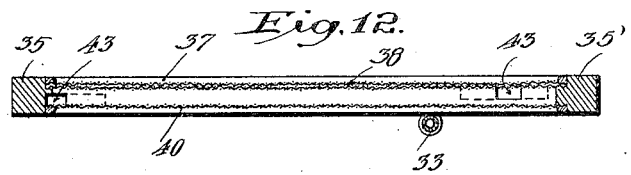

UNITED STATES PATENT OFFICE.

GUY O. WALTERS, OF LONG BEACH, CALIFORNIA.

COMBINED WINDOW-SCREEN AND FLY-TRAP.

1,182,333.   Specification of Letters Patent.   Patented May 9, 1916.

Application filed May 19, 1915. Serial No. 29,065.

*To all whom it may concern:*

Be it known that I, GUY O. WALTERS, a citizen of the United States, residing at Long Beach, in the county of Los Angeles and State of California, have invented a new and useful Combined Window-Screen and Fly-Trap, of which the following is a specification.

This invention relates to improvements in fly traps and resides in the provision of a trap which is constructed so that it may be used as a window screen and will provide for an effective trapping of flies from the interior or exterior of a room.

An object of importance is to provide a fly trap and window screen of the character described which is of simple construction, is capable of being attached to windows without necessitating any material change in the construction thereof and which may be cheaply and easily manufactured.

The invention consists in certain novel features of construction and combinations, and arrangement of parts as will be more fully hereinafter described and pointed out in the claims.

The accompanying drawings illustrate the invention.

Figure 1 is a front elevation of my improved trap and window screen combined; Fig. 2 is a vertical sectional view taken on line 2—2 of Fig. 1; Fig. 3 is a horizontal sectional view taken on line 3—3 of Fig. 1; Fig. 4 is a horizontal sectional view taken on line 4—4 of Fig. 1; Fig. 5 is a horizontal sectional view taken on line 5—5 of Fig. 1; Fig. 6 is a fragmentary vertical sectional view taken on line 6—6 of Fig. 4; Fig. 7 is a view similar to Fig. 6 taken on line 7—7 of Fig. 4; Fig. 8 is a view similar to Fig. 7 taken on line 8—8 of Fig. 4; Fig. 9 is a front elevation of the preferred form of screen and trap; Fig. 10 is a vertical sectional view of the preferred form shown in Fig. 9, taken on line 10—10 of Fig. 9; Fig. 11 is a horizontal sectional view taken on line 11—11 of Fig. 9; and Fig. 12 is a horizontal sectional view taken on line 12—12 of Fig. 9.

Referring to the drawings, 1 designates a rectangular frame comprising side bars 2 and 3 and top and bottom bars 4 and 5, respectively. A sheet of screening or foraminous material 6 and what shall be hereinafter referred to as the inner sheet is secured to the frame near the inner sides of the bars 2, 3, 4 and 5 in any suitable manner, and near the lower end of the frame the sheet is provided with entrance orifices 7.

An auxiliary frame 8 comprising side bars 9 and top and bottom bars 10 and 11 is secured upon the outer faces of the side and bottom bars of the frame 1 and is approximately and preferably three-fourths the length of the frame 1. A sheet 12 of foraminous material is secured upon the auxiliary frame 8 as is the sheet 6 but near the outer faces of the bars and will hereinafter be referred to as the outer sheet. Near the lower end of the sheet 12 are formed entrance orifices 13 similar to the ones 7.

The inner and outer sheets 6 and 12 are spaced from one another and located between and in spaced relation to both sheets is partition means consisting of an intermediate sheet of foraminous material 14. This sheet is secured between and to the frames 1 and 8. A horizontal bar 15 is secured to the bars 2 and 3 of the frame 1 between the inner and intermediate sheets, in engagement with said sheets and in alinement with the top bar of the frame 8. The partition bar 15 is provided with openings 16 which extend through the bar, and are preferably larger at their lower ends than at their upper ends and open upon opposite longitudinal sides of the bar. The intermediate sheet is extended above the partition bar 15 and then bent over and extended down between the bar and inner sheet and secured in such position to form a compartment 17 which has communication with the spaces between the intermediate and inner and outer sheets.

To provide for communication of the compartment 17 with the space between the intermediate and outer sheets, the top bar 10 of the auxiliary frame 8 is recessed as at 18 and said recess communicates with one of the openings in the bar 15 through an opening 19 formed in the intermediate sheet. The recess 18 decreases in size near the upper edge of the bar 10 and as said bar 10 closely engages the intermediate sheet, the flies are prevented from escaping by crawling up between the bar 10 and intermediate sheet. The openings 16 in the bar 15 are preferably V-shaped with the larger ends lowermost so as to give sufficient light to attract the flies and cause them to crawl upwardly therethrough.

I provide a semi-circular cage 21 which consists of semi-circular end plates 22 about the peripheries of which is secured a sheet of foraminous material 23. The end plates 22 are connected with one another by upper and lower connecting bars 24 and 25 and said lower bar 25 is designed to rest upon the upper bar 10 of the auxiliary frame 8. The foraminous material 23 covers the bars 24 and 25 and at a point between said bars is provided with preferably a single orifice 26. The material between the bars 24 and 25 engages the side and top bars of the main frame and as it is spaced from the inner sheet 6 forms a free space which is communicated with the compartment 17 by preferably a single orifice 27 formed in the upper side of the compartment 17. The flies upon entering the spaces between the upper portion of the inner sheet and cage will find access to the cage through the single orifice 26 formed in the inner wall of said cage, said orifice 26 being preferably located near the upper edge of the inner wall of the cage.

Hooks 28 are secured upon the outer faces of the end plates of the cage and coöperate with screw-eyes 29 carried upon the outer sides of the side bars 2 and 3. The hooks and eyes hold the cage in close engagement with the upper portion of the main frame and upon the upper bar 10 of the auxiliary frame.

A cleanout opening 30 is formed in one end plate of the cage and is closed by a door 31 pivoted on said end wall. The opening is of sufficient size to enable insertion of a suitable instrument into the cage to effect the removal of the flies therefrom.

Connected with the lower part of the cage at a point near one of the side bars of the auxiliary frame is a depending cleanout tube or pipe 33. This pipe may be of any length desired and is preferably extended to a point below the main frame so that the flies may be caused to drop upon the ground or into a receptacle, not shown, placed beneath the tube. As the wind blows through the cage the flies therein which have died from confinement will be blown into the tube and will then drop therethrough.

In practice, the screen with the cage outermost, is placed upon a window frame and serves as a window screen as well as a fly trap.

In operation the flies on crawling upon the inner and outer sheets 6 and 12 are permitted to enter the spaces between the intermediate sheet 14 and inner and outer sheets through the openings 13 and 7 and will crawl upwardly upon the intermediate or inner and outer sheets, through the openings 16 in the partition bar 15 and also through the recess 18 and the openings 19 in the intermediate sheet into the partition bar opening 16 which communicates therewith and from thence into the compartment 17. The flies will then crawl through the single orifice 27 in the upper end of the compartment 17 and into the space between the cage and inner sheet 6 and from thence through orifice 26 into said cage. After the cage has become sufficiently filled it may be removed, if desired, and the flies shaken therefrom through the tube 33 and the cleanout opening 30 in one end plate.

Referring particularly to Figs. 9 to 12 wherein I have illustrated a modified form of screen, 34 designates a main frame comprising side bars 35, 35' and top and bottom bars 36 and 37. Secured to the bars is an inner foraminous sheet 38.

An auxiliary rectangular frame 39 is secured upon the frame 34 and is of substantially the same size and arrangement as is the auxiliary frame in the preferred form. An outer sheet of foraminous material 40 is secured between the frame 39 and the main frame 34. A horizontal partition bar 41 is positioned between and in engagement with the faces of the inner and outer sheets and secured at its ends to the side bars of the main frame. The outer sheet is extended above the partition bar and is bent over and then extended down between the inner sheet and the partition bar and secured in such position to provide a compartment 42 which corresponds to the compartment 17 of the preferred form. On the outer face the horizontal partition bar 41 is formed with recesses 43 extending from the upper to the lower edges thereof and which communicate the space between the inner and outer sheets with the compartment 41. The recesses 43 are preferably larger at their lower ends so as to induce the flies to crawl upwardly by giving plenty of light at points where the recesses are formed. The ends of the compartment 42 are closed by the side bars of the frame 34.

I provide partition means between the inner and outer sheets to cause the flies to crawl upwardly into the compartment 42 and prevent them from crawling through the inner sheets and escaping out through the outer sheet or vice versa. The partition means comprise preferably a vertical bar 44 that is secured at its lower end to the lower bar of the main frame and at its inner end to the horizontal partition bar 41. This partition bar extends vertically near the side bar 35' of the main frame but is spaced therefrom and engages the inner and outer sheets so as to provide a vertical space or chamber between it and said side bar of the frame. Diagonal partition bars 45 and 46 are secured at their ends to the vertical partition bar and to the other side bar of the main frame between and in engagement with the inner and outer sheets. These bars 45 and 46 are arranged one above the other and divide the space between the inner and outer sheets into three sections. The inner and outer sheets are alternately provided with orifices 47 relative to the sections so as to prevent the flies from crawling through the inner sheet orifices and escaping through the outer sheet orifices. On opposite sides the vertical partition bar is provided with recesses 48 and 49 which communicate the spaces between the diagonal partition bars with the space between the vertical partition bar and frame bar 35'. The latter space is communicated with one of the compartments 42 by the recesses in the horizontal partition bar.

A cage designated 50 and identical with the cage 21 in the preferred form is secured to the upper end of the main frame and is arranged for communication with the compartment 42 by an opening 43 formed in the upper end of said compartment.

The inner and outer sheets are provided with cleanout openings 51, 52, 53 and 54 which are located respectively above the bars 46, 45 and lower bar of the auxiliary frame. Pivoted doors 55 normally close the openings and said openings are located at such points that will enable dead flies within the spaces provided by the partition means to be easily removed.

In practice I have found that the form of my invention illustrated in the drawings and referred to in the above description as the preferred embodiment is the most efficient and practical, yet realizing that the conditions concurrent with the adoption of my device will necessarily vary, I desire to emphasize the fact that various minor changes in construction, proportion and arrangement of parts may be resorted to when required without sacrificing any of the advantages of my invention as set forth in the appended claims.

I claim:

1. A combined fly trap and window screen comprising a window screen frame, inner and outer sheets of foraminous material secured to said frame in spaced relation to one another, each of said sheets having fly entrance orifices near its lower end, a cage carried by said frame, partition means between the sheets to prevent flies from crawling through both sheets and for inducing the flies to crawl upwardly, and means for communicating the cage with the spaces between the inner and outer sheets.

2. A combined fly trap and window screen comprising a frame, inner and outer sheets of foraminous material secured to the frame in spaced relation to each other, a plurality of partition bars mounted between and in engagement with the sheets and dividing the space between the sheets into a number of sections, certain parts of the inner and outer sheets being provided with entrance orifices for communication with certain of the sections of spaces between said inner and outer sheets, a cage, and means to communicate the cage with the spaces provided between the inner and outer sheets.

3. A combined fly trap and screen comprising a screen frame, inner and outer sheets of foraminous material secured on opposite sides of the frame, each of said sheets having fly entrance orifices formed therein, partition means located between the screens to prevent the flies from crawling through one screen and out through the other and for inducing them to crawl upwardly including a horizontal partition bar mounted between the sheets, a compartment independent of the sheets arranged above the partition bar, said partition bar having openings therein communicating said compartment with the space between the sheets below the partition bar, and a trap mounted upon the frame and having communication with the compartment.

In testimony whereof I have hereunto set my hand at Los Angeles, California, this 8th day of May, 1915.

GUY O. WALTERS.

In presence of—
Chas. J. Chunn,
L. Belle Weaver.

Copies of this patent may be obtained for five cents each, by addressing the "Commissioner of Patents, Washington, D. C."